United States Patent
Subbiah et al.

(10) Patent No.: US 9,815,028 B2
(45) Date of Patent: Nov. 14, 2017

(54) METHOD FOR SCALING CONTROL IN A MEMBRANE SYSTEM OPERATION VIA A CONTROL SYSTEM OF A PLANT

(71) Applicant: ABB RESEARCH LTD, Zurich (CH)

(72) Inventors: Senthilmurugan Subbiah, Kovilpatti (IN); Srinivas Mekapati, Arundelpet (IN); Mohan S. Kumar, Tiruvallur (IN)

( * ) Notice: Subject to any disclaimer, the term of this patent is extended or adjusted under 35 U.S.C. 154(b) by 725 days.

(21) Appl. No.: 13/893,893

(22) Filed: May 14, 2013

(65) Prior Publication Data

US 2013/0248444 A1 Sep. 26, 2013

Related U.S. Application Data

(63) Continuation of application No. PCT/IB2011/002508, filed on Oct. 20, 2011.

(51) Int. Cl.
*B01D 65/02* (2006.01)
*C02F 1/44* (2006.01)
(Continued)

(52) U.S. Cl.
CPC .......... *B01D 65/08* (2013.01); *B01D 61/025* (2013.01); *B01D 61/027* (2013.01); *B01D 61/04* (2013.01); *B01D 61/12* (2013.01); *B01D 61/145* (2013.01); *B01D 61/147* (2013.01); *B01D 61/16* (2013.01); *B01D 61/22* (2013.01); *C02F 5/08* (2013.01); *B01D 2311/04* (2013.01); *B01D 2321/16* (2013.01)

(58) Field of Classification Search
CPC ....... A61M 1/16; A61M 1/1656; B04B 13/00; B01D 21/14; B01D 21/18; B01D 21/24; B01D 21/2433; B01D 21/30; B01D 24/38; B01D 25/30; B01D 29/39; B01D 29/88; B01D 33/70; B01D 33/82; B01D 61/00; B01D 61/025; B01D 61/027; B01D 61/04; B01D 61/08; B01D 61/12; B01D 61/16; B01D 61/18; B01D 61/20; B01D 61/22; B01D 61/145; B01D 61/147

See application file for complete search history.

(56) References Cited

U.S. PATENT DOCUMENTS 5,256,303 A  10/1993  Zeiher et al.
5,358,640 A  10/1994  Zeiher et al.
(Continued)

OTHER PUBLICATIONS

Jena et al. (A generalized shrinking core model applied to batch adsorption, Chem Eng. J., 95:1-3, (Sep. 15, 2003), pp. 143-154).*

(Continued)

*Primary Examiner* — Dirk Bass
*Assistant Examiner* — Hayden Brewster
(74) *Attorney, Agent, or Firm* — Barnes & Thornburg LLP

(57) ABSTRACT

A method is disclosed for scaling control in a membrane system operation. The method can be performed by a model in the control system of a plant. The method can include selecting one or more antiscalants corresponding to one or more components of the scale, based on one or more of feed water condition, membrane material, membrane fouling status and a kinetic study relating to a reaction between the antiscalants and the components of the scale. The composition of one or more selected antiscalants can be estimated based on an overall scaling rate constant.

9 Claims, 1 Drawing Sheet

(51) Int. Cl.
*B01D 65/08* (2006.01)
*B01D 61/04* (2006.01)
*B01D 61/12* (2006.01)
*B01D 61/16* (2006.01)
*B01D 61/22* (2006.01)
*C02F 5/08* (2006.01)
*B01D 61/02* (2006.01)
*B01D 61/14* (2006.01)
B04B 13/00 (2006.01)
B01D 61/00 (2006.01)

(56) References Cited

U.S. PATENT DOCUMENTS

| 2009/0188861 A1* | 7/2009 | Higgin | B01D 61/025 |
| | | | 210/636 |
| 2010/0193435 A1 | 8/2010 | Blankert et al. | |
| 2010/0282679 A1 | 11/2010 | Langlais | |
| 2013/0060384 A1* | 3/2013 | Subbiah | B01D 61/12 |
| | | | 700/266 |

OTHER PUBLICATIONS

Safari et al. (A shrinking particle—shrinking core model for leaching of a zinc ore containing silica, Int. J. Miner. Process., 93 (Jun. 23, 2009), pp. 79-83).*
International Search Report (PCT/ISA/210) mailed Feb. 24, 2012, by the Indian Patent Office as the International Searching Authority for International Application No. PCT/IB2011/002508.

* cited by examiner

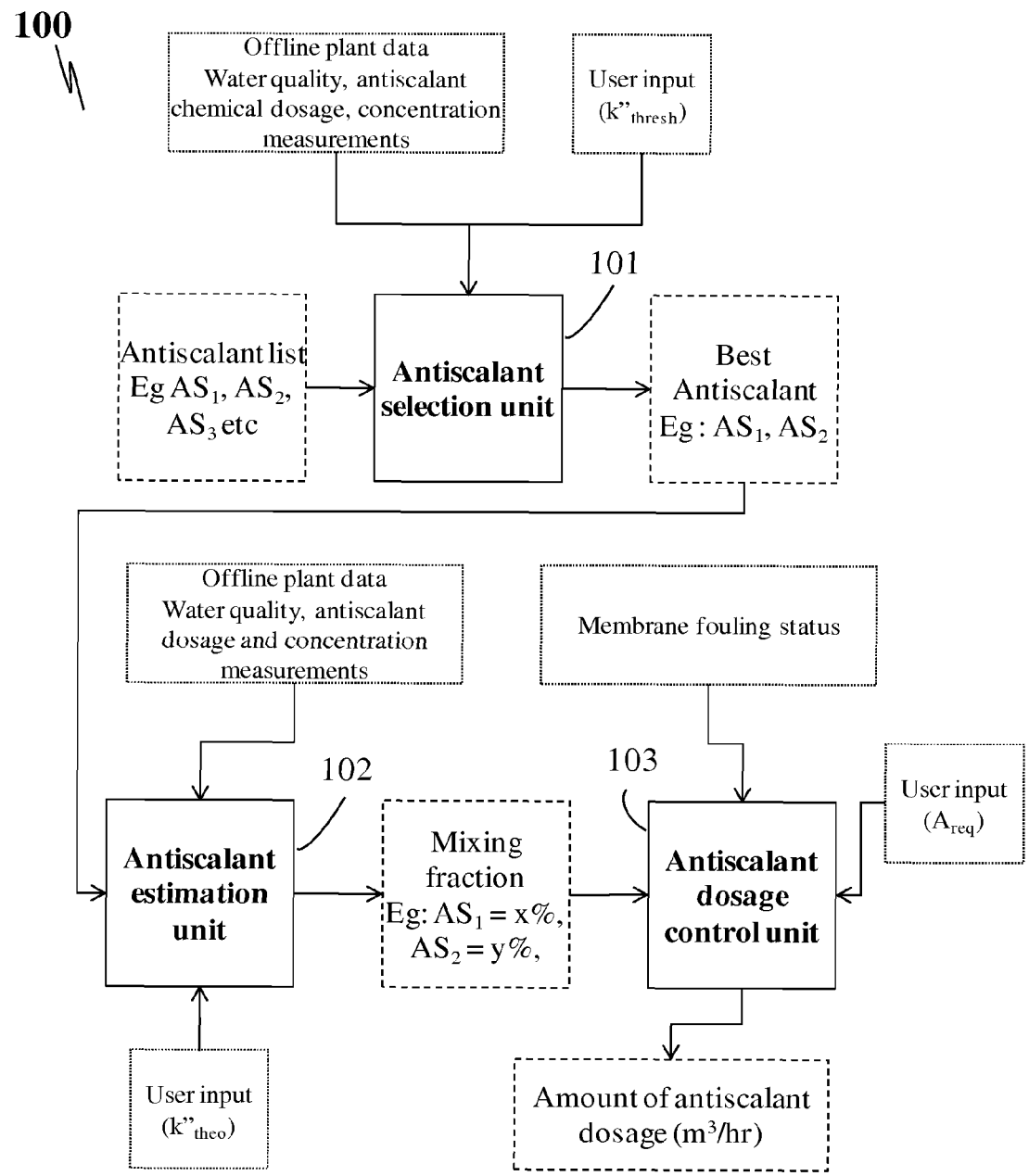

ical applications, antiscalant is suggested based on the type of component which is dominantly present in the feed water. For example, sodium hydroxide is suggested for sulfate scales and organic fouling, hydrochloric acid is suggested for carbonate scale and so forth. The antiscalant recommended will dissolve only that particular component and may not dissolve all the components present in the scale. Hence, it may be desired to use a mixture of antiscalants with a particular composition, in order to dissolve and remove all the components present in the scale.

METHOD FOR SCALING CONTROL IN A MEMBRANE SYSTEM OPERATION VIA A CONTROL SYSTEM OF A PLANT

RELATED APPLICATION

This application claims priority as a continuation application under 35 U.S.C. §120 to PCT/IB2011/002508, which was filed as an International Application on Oct. 20, 2011 designating the U.S., and which claims priority to Indian Application 3566/CHE/2010 filed in India on Nov. 26, 2010. The entire contents of these applications are hereby incorporated by reference in their entireties.

FIELD

A membrane system operation is disclosed, such as a method and a system for scaling control in a membrane system operation.

BACKGROUND

Membrane technology includes process engineering measures for the transport of substances between two fractions with the help of permeable membranes. It can find practical applications in membrane system operations involving membrane process, such as but not limited to Reverse Osmosis (RO), Ultra Filtration (UF), Microfiltration (MF), etc.

Raw seawater contains sparingly soluble salts, such as carbonate scale, sulfate scale, bio-scale and so forth which have very low solubility thereby constituting a very high specific potential for scaling on membrane surface of the permeable membranes used in the membrane system operations. The concentration of these salts in reject water increases with the extent of removal of product water. The high concentration of low solubility salts can cause precipitation and crystallization of salts on membrane surface. This phenomenon is known as membrane scale formation. Similarly the organic salts and microorganism in the feed water also gets deposit on the membrane surface and on the spacers, and this phenomenon is known as membrane fouling. Membrane fouling/scaling causes a higher energy use and a shorter life span of the membranes, because of the more often need for cleaning.

Inorganic salts such as calcium carbonate, barium sulfate and so forth which are water insoluble can become oversaturated, causing them to precipitate. Hence the feed water to membrane process is treated with scaling control chemicals to avoid precipitation of these salts on the membrane surface. These scaling control chemicals are called as antiscalants. The antiscalants adsorb onto growth sites of the scales and prevent further growth, crystallization and precipitation of scalants. The type of antiscalant chosen governs the extent of diffusion kinetics reaction between the scalant and antiscalant. Also, in order to avoid deposition of organic content on the membrane surface, the feed water is treated with alkaline solution as antiscalant. Hence the choice of antiscalant and its dosage can be very important in scaling/fouling control of membranes for better membrane performance and operation.

Currently, the type of antiscalant used and its dosage are determined based on recommendations from membrane manufacturers, chemical suppliers, consultants and the feed water quality. The scale deposited in the membrane could be predominantly either carbonate scale, sulfate scales, bio-scale and so forth, depending on the feed water quality. In industrial applications, antiscalant is suggested based on the type of component which is dominantly present in the feed water. For example, sodium hydroxide is suggested for sulfate scales and organic fouling, hydrochloric acid is suggested for carbonate scale and so forth. The antiscalant recommended will dissolve only that particular component and may not dissolve all the components present in the scale. Hence, it may be desired to use a mixture of antiscalants with a particular composition, in order to dissolve and remove all the components present in the scale.

The antiscalants are dosed along with feed water to maintain their concentration at a specific value in the reject stream. Since some of the antiscalants are not measurable by available sensors in the market, a fixed excess amount of antiscalants are dosed to prevent membrane scaling and subsequent damage. This technique is based on a rule of thumb and can result in excess use of antiscalants which are highly expensive, and does not consider the current condition or status of a membrane to estimate the amount of antiscalants to dissolve existing scale precipitates and crystals at a membrane surface. It should be noted that, even though in practice a fixed excess amount of antiscalants are dosed, the amount of antiscalant present in the product water and reject stream should be within allowable limits as recommended by World Health Organization (WHO) such that it does not involve any post-treatment operations to remove these antiscalant chemicals.

The present disclosure includes methods for choosing proper antiscalants and optimal dosages. The membrane cleaning chemistry and its kinetics can be vital in deciding the proper choice of antiscalant while the dosage of antiscalants is estimated based on membrane fouling status.

SUMMARY

A method for scaling control in a membrane system operation is disclosed, by a model in a control system of a plant, the method comprising selecting one or more antiscalants corresponding to one or more components of: a scale, based on one or more of feed water condition, membrane material, membrane fouling status and a kinetic study relating to a reaction between the antiscalants and the components of the scale; estimating a composition of the one or more selected antiscalants based on an overall scaling rate constant; and administering a dosage of the estimated composition of the one or more antiscalants for scaling control in a membrane system operation.

A system for scaling control in a membrane system operation is also disclosed, the system comprising: a control system having a control system model; one or more sensors to obtain plant data; an antiscalant selector unit for selecting one or more antiscalants corresponding to one or more components of a scale; an antiscalant estimation unit for estimating a composition of the one or more selected antiscalants; and an antiscalant dosage control unit for administering and/or controlling dosage of the estimated composition of the one or more antiscalants.

BRIEF DESCRIPTION OF THE DRAWING

A detailed description of exemplary preferred embodiments will be described herein with reference to the accompanying drawing, in which:

FIG. 1 shows an exemplary system for scaling control in a membrane system operation.

DETAILED DESCRIPTION

A method is disclosed for scaling control in which antiscalants desired for a membrane system operation are selected appropriately.

A method is disclosed for scaling control in which the compositions of antiscalants desired for the membrane system operation are estimated appropriately.

A method is disclosed for scaling control in which an optimal dosage of an estimated composition of antiscalants desired for the membrane system operation is determined.

A system is also disclosed for performing scaling control in a membrane system operation.

As disclosed herein, an exemplary method for scaling control in a membrane system operation is performed by a model in the control system of a plant. The method can comprise selecting one or more antiscalants corresponding to one or more components of the scale. This can be based on one or more of feed water condition, membrane material, membrane fouling status and a kinetic study relating to a reaction between the antiscalants and components of the scale. Estimating the composition of one or more selected antiscalants can be based on the overall scaling rate constant. Administering a dosage of the estimated composition of one or more antiscalants can then be performed.

Accordingly, a system is disclosed for scaling control in a membrane system operation in accordance with the disclosed method. The system can include a control system (e.g., specially programmed processor) having a model, and can comprise one or more sensors to obtain plant data. The disclosed system can include an antiscalant selector unit configured (e.g., a specifically programmed processor) for selecting one or more antiscalants corresponding to one or more components of the scale. An antiscalant estimation unit can be provided and configured (e.g., specially programmed processor) for estimating the composition of one or more selected antiscalants. An antiscalant dosage control unit can be provided and configured (e.g., specially programmed processor) for administering and/or controlling the dosage of the estimated composition of one or more antiscalants. The control system can correspond to a Distributed Control System, Programmable Logic Controller or any microprocessor based embedded system, and can provide any or all of the processor configured functions disclosed herein as, for example, separate control modules. The model of the system can cater (e.g., control and/or interface) to one or more of the antiscalant selector unit, the antiscalant estimation unit and the antiscalant dosage control unit.

With reference to a non exhaustive exemplary embodiment of FIG. 1, a system is shown for scaling control in a membrane system operation. A method is coextensively described in conjunction with the exemplary system.

The system can have a control system which corresponds to a Distributed Control System, Programmable Logic Controller or any microprocessor based embedded system. The control system has a model for performing a method for scaling control in a membrane system operation. The method and system can, for example, scale control through proper selection of antiscalants, appropriate composition of the selected antiscalants and through administering optimal dosage of antiscalants.

The system can have at least one sensor for obtaining the relevant plant data. The plant data referred to herein can include one or more of feed flow rate, feed pressure, feed concentration, reject flow rate, reject pressure, product flow rate, product concentration and so forth. The system also can have an antiscalant selector unit, an antiscalant estimation unit and an antiscalant dosage control unit.

The antiscalant selector unit (101) is provided for selecting one or more antiscalants. The antiscalants can be identified from a desired source, such as a list of antiscalants provided by a membrane manufacturer, and can correspond to the components present in the scale. Such selection is not made based on a rule of thumb. Rather, the selection of one or more antiscalants accordingly can, for example, be based on a kinetic study. The kinetic study relates to a reaction between the antiscalants and the components of the scale.

With regard to the kinetic study referred to herein, the rate of reaction ($R_c$) and kinetics of the reaction between the antiscalant and scale deposits in feed water can be derived based on a shrinking core model. The shrinking core model herein considers, for example, chemical reaction control and solid particle mass transfer diffusion control.

For example:

$$R_c = -k'' C^a \tag{1}$$

$$C = C_{init} \exp\left(\frac{F_{in}}{k''}\right) \tag{1}$$

$$\frac{1}{k''} = \frac{1}{k_c} + \frac{1}{k_m} \tag{2}$$

$$k_c = k_0 \sqrt{T} \exp\left(-\frac{184000}{RT}\right) \tag{3}$$

$$k_m = \frac{D_m}{d_p}\left[2 + 0.6\left(\frac{d_p u \rho}{\mu}\right)^{\frac{1}{2}}\left(\frac{\mu}{\rho D_m}\right)^{\frac{1}{3}}\right] \tag{5}$$

where,
$R_c$ is rate of reaction, kg/m² s;
C is antiscalant concentration, kg/m³;
$C_{init}$ is inlet concentration of fresh antiscalant chemical, kg/m³;
$k_c$ is chemical reaction rate constant;
$k_m$ is solid particle mass transfer diffusion control rate constant, m/s;
u is cross flow velocity of antiscalant, m/s;
μ is viscosity of the antiscalant chemical, kg/(m·s);
ρ is density of the antiscalant chemical, kg/m³;
$D_m$ is molecular diffusion coefficient, m²/s;
a is reaction order, (−);
T is temperature, ° C.;
$d_p$ is equivalent diameter of the particle, m Using offline plant measurements such as water quality, antiscalant flow rate and its concentration, the overall rate constant (k") can be calculated. The antiscalant selector unit (101) makes use of the value of the overall rate constant (k") in selecting the antiscalant.

The antiscalant can be selected such that it gives a high overall rate constant value k". The value of k" indicates the extent of reaction that takes place between the antiscalant and the scale material. The higher the value of k", the higher the chances the antiscalant chosen is correct. If the value of k" for a particular antiscalant is less than some threshold value ($k''_{thresh}$), then that particular antiscalant is not chosen. For example, as shown in FIG. 1, an exemplary list of antiscalants is shown such as a list suggested by the membrane manufacturer, which are $AS_1$, $AS_2$ and $AS_3$. If the k" value of antiscalants $AS_1$ and $AS_2$ are greater than $k''_{thresh}$ and a k" value for antiscalant $AS_3$ is less than $k''_{thresh}$, then the antiscalants $AS_1$ and $AS_2$ are selected from the list.

The antiscalants so selected in respect of the components of the scale can be mixed in an appropriate fraction so as to form a desired (e.g., correct) composition of antiscalants. This is because certain antiscalants can dissolve only certain components or its corresponding component in the scale. Hence, there is a desire for such mixture of antiscalant catering to its relevant or corresponding component(s) in the scale. It is not trivial to have an appropriate mixture of antiscalants with correct composition.

An antiscalant estimation unit (102) is provided for estimating the composition of one or more selected antiscalants to form an appropriate and desired mixture of antiscalants. Here, the mixing fraction of the set of antiscalants selected as described herein is estimated. For example, antiscalants $AS_1$ and $AS_2$ are selected as stated herein, and the percentage of $AS_1$ and $AS_2$ to be mixed is to be decided. The antiscalant estimation unit (102) makes use of the value of the overall rate constant (k") to estimate the mixing fraction. The value of k" estimated is compared with the theoretical value of the k" and a mixing fraction is selected such that any error between the estimated and theoretical value of k" is minimized. For the example considered, this unit estimates the $X_1\%$ of $AS_1$ and $X_2\%$ of $AS_2$. The k" can be estimated using offline plant measurement, and the theoretical value of k" corresponds to the rate at which complete removal of scale material takes place.

Further, the estimated composition of antiscalants can be administered for the membrane system operation. This can include determining the optimal dosage of the estimated composition of antiscalants. The antiscalant dosage control unit (103) is provided for administering and/or controlling the dosage of the estimated composition of one or more antiscalants. This can be done based on a value of a membrane fouling status. The membrane fouling status can be estimated using a first principles model for a membrane separation process. The model can estimate membrane transport parameters such as hydrodynamic permeability (A) and solute permeability (B). Membrane transport parameters are affected by membrane fouling. These membrane transport parameters can be estimated by using plant data such as feed flow rate, feed pressure, feed concentration, reject flow rate, reject pressure, product flow rate, product concentration and so forth (e.g., plant parameters can be monitored and scale terminal thresholds can be considered indicative of membrane transport).

The change in hydrodynamic permeability over time with respect to a different antiscalant flow rate can be given by:

$$\frac{dA}{dt} = -A_0 + k \times F_{in} \quad (6)$$

where,
$A_0$ is initial hydrodynamic permeability obtained from a membrane performance solution;
k is scaling rate constant, which could be obtained from a past history of hydrodynamic permeability and antiscalant flow rate data; and
$F_{in}$ is flow rate of antiscalant, m³/hr:

The flow rate of the estimated composition of antiscalants can be adjusted to minimize any error between current and desired values for a membrane fouling status (hydrodynamic permeability value) as given in equation 6. In this control strategy, the membrane fouling status is sent to a membrane performance controller (MIC) which in turn determines a set-point for the flow controller (FIC) for dosage chemicals (e.g., for dosing the estimated composition of antiscalants).

The estimated composition of selected antiscalants and its dosage can be determined by formulating an objective function such as that given below:

$$Obj = \min_{x_i, F_{in}} \left\{ (k''_{est} - k''_{theo})^2 + \sum_{t=0}^{T} F_{in} * T * C_c + (A - A_{req})^2 \right\} \quad (7)$$

where,
A is current hydrodynamic permeability obtained from membrane performance solution;
$A_{req}$ is desired hydrodynamic permeability provided by the user/customer;
$C_c$ is cost per kg of antiscalant;
$k''_{est}$ is estimated value of overall rate constant from offline measurement data, m²/s;
$k''_{theo}$ is theoretical value of overall rate constant corresponding to complete removal of scale material, m²/s; and
$x_i$ is estimated antiscalant % mixing composition;
Subject to constraint:

$$F_{in,min} \leq F_{in} \leq F_{in,max}$$

where,
$F_{in,min}$ & $F_{in,max}$ are minimum and maximum allowed flow rate of antiscalants, m³/hr The first term in the objective function relates to estimating the composition of antiscalants selected (e.g., estimating the mixture of the selected antiscalants thereof). The second term in the objective function minimizes the cost of antiscalants, and the third term selects the antiscalant flow rate as described in administering or controlling the dosage of the estimated composition of antiscalants.

The invention is not restricted by the preferred exemplary embodiments described herein. It is to be noted that the invention is explained by way of exemplary embodiments which are neither exhaustive nor limiting. Certain aspects of the invention that have not been elaborated upon herein in the description but that are well understood by those skilled in the art, are encompassed herein. Also, the terms relating to singular form used herein in the description also include their plurality and vice versa, wherever applicable. Any relevant and readily apparent modifications or variations, which is not described specifically in the specification, are to be construed of being within the scope of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:
1. A method for scaling control in a membrane system operation by a control system of a plant, wherein the control system comprises (i) a flow controller for varying a flow rate of one or more antiscalants and (ii) one or more sensors installed in the plant for measuring plant data including at least one of feed flow rate, feed pressure, feed concentration, reject flow rate, reject pressure, product flow rate, and product concentration, the method comprising:

selecting, by the control system, one or more antiscalants corresponding to one or more types of scale components, based on feed water condition, membrane material, and a kinetic study relating to a reaction between the one or more antiscalants and the one or more types of scale components, wherein selecting the one or more antiscalants comprises determining an overall rate constant based on water quality and antiscalant flow rate;

estimating, by the control system, a composition of the one or more selected antiscalants and a dosage of the estimated composition of the one or more selected antiscalants based on the overall rate constant, membrane fouling status, and an objective function, wherein the objective function includes a first term for estimating the composition of the one or more selected antiscalants, a second term for minimizing cost of antiscalant, and a third term for selecting antiscalant flow rate in administering the dosage of the estimated composition of the one or more selected antiscalants, wherein the membrane fouling status is determined based on a model for estimating membrane transport parameters using the plant data measured by the one or more sensors, and wherein estimating the dosage of the estimated composition of the one or more selected antiscalants comprises determining one or more set-points for the flow controller; and administering, by the flow controller, the estimated dosage of the estimated composition of the one or more selected antiscalants for scaling control in the membrane system operation based on the determined one or more set-points for the flow controller;

wherein the kinetic study relating to the reaction between the one or more antiscalants and the one or more types of scale components is derived using a shrinking core model including chemical reaction control and solid particle mass transfer diffusion control.

2. The method as claimed in claim 1, wherein the selecting of one or more antiscalants is based on a membrane manufacturer list of antiscalants.

3. The method as claimed in claim 1, wherein estimating the composition of one or more selected antiscalants comprises:
  calculating, by the control system, the overall rate constant using offline plant measurements.

4. The method as claimed in claim 1, wherein administering the dosage of the estimated composition of one or more selected antiscalants is based on a membrane fouling status.

5. The method as claimed in claim 1, wherein the membrane fouling status is determined based on an estimation of at least one time varying physical parameter of the membrane.

6. The method as claimed in claim 5, comprising:
  estimating, by the control system, the time varying physical parameters of the membrane based on the plant data.

7. The method as claimed in claim 5, wherein the time varying physical parameters include at least one of:
  hydrodynamic permeability of the membrane and solute permeability of the membrane.

8. The method as claimed in claim 4, wherein the membrane fouling status is determined based on an estimation of at least one time varying physical parameter of the membrane.

9. The method as claimed in claim 3, wherein the offline plant measurements include at least one of water quality, antiscalant flow rate and antiscalant concentration.

* * * * *